US008838896B2

(12) United States Patent
Govindaswamy et al.

(10) Patent No.: US 8,838,896 B2
(45) Date of Patent: Sep. 16, 2014

(54) WAVEFORM CACHING FOR DATA DEMODULATION AND INTERFERENCE CANCELLATION AT A NODE B

(75) Inventors: Senthil Govindaswamy, San Diego, CA (US); Jeffrey A. Levin, San Diego, CA (US); Raghu Sagar Madala, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 12/123,982

(22) Filed: May 20, 2008

(65) Prior Publication Data

US 2008/0301367 A1 Dec. 4, 2008

(51) Int. Cl.
*G06F 12/08* (2006.01)
*H04B 1/7103* (2011.01)

(52) U.S. Cl.
CPC .......... *H04B 1/7103* (2013.01); *G06F 12/0802* (2013.01); *H04B 2201/70707* (2013.01)
USPC ................... 711/118; 711/127; 711/E12.017; 711/E12.079

(58) Field of Classification Search
None
See application file for complete search history.

(56) References Cited

U.S. PATENT DOCUMENTS

| 5,621,800 | A | 4/1997 | Weng et al. |
| 7,010,713 | B2 | 3/2006 | Roth et al. |
| 7,376,175 | B2 | 5/2008 | Oates et al. |
| 2003/0231702 | A1* | 12/2003 | Oates et al. ................. 375/148 |
| 2005/0025140 | A1* | 2/2005 | Deforche et al. ............ 370/363 |

FOREIGN PATENT DOCUMENTS

| JP | 8251040 A | 9/1996 |
| TW | 200642311 | 12/2006 |
| TW | 200703943 | 1/2007 |
| WO | WO2004102891 A1 | 11/2004 |

OTHER PUBLICATIONS

Chakrapani, Anuj; "QDR SRAM and RLDRAM: A comparative analysis"; Feb. 2006; EETimes; <<http://www.eetimes.com/design/programmable-logic/4014347/QDR-SRAM-and-RLDRAM-A-comparative-analysis/>>;pp. 1-9.*
International Search Report—PCT/US08/064579, International Search Authority—European Patent Office, Sep. 11, 2008.
Written Opinion—PCT/US08/064579, International Search Authority—European Patent Office, Sep. 11, 2008.
Taiwan Search Report—TW097120336—TIPO—Jun. 4, 2012.

* cited by examiner

*Primary Examiner* — Christian P Chace
*Assistant Examiner* — Eric Loonan
(74) *Attorney, Agent, or Firm* — Charles Chesney

(57) ABSTRACT

The present patent application discloses a method and apparatus for using external and internal memory for cancelling traffic interference comprising storing data in an external memory; and processing the data samples on an internal memory, wherein the external memory is low bandwidth memory; and the internal memory is high bandwidth on board cache. The present method and apparatus also comprises caching portions of the data on the internal memory, filling the internal memory by reading the newest data from the external memory and updating the internal memory; and writing the older data back to the external memory from the internal memory, wherein the data is incoming data samples.

35 Claims, 11 Drawing Sheets

WAVEFORM CACHING FOR DATA DEMODULATION AND INTERFERENCE CANCELLATION AT A NODE B

CROSS-REFERENCE TO RELATED APPLICATION

This application claims the benefit under 35 U.S.C. §119 of Provisional Application Ser. No. 60/940,949, Waveform Caching for Data Demodulation and Interference Cancellation at Node B, filed May 30, 2007.

BACKGROUND

1. Field of the Invention

The present application pertains to memory design.

2. Background

Universal Mobile Telecommunications System (UMTS) is one of the third-generation (3G) mobile telephone technologies (or 3rd Generation Wireless Mobile Communication Technology). A UMTS network consists of 1) a core network (CN), 2) a UMTS terrestrial radio access network (UTRAN) and 3) user equipment (UE). The core network work provides routing, switching, and transit for user traffic. A Global System for Mobile Communications (GSM) network with General Packet Radio Service (GPRS) is the basic core network architecture that UMTS is based on. The UTRAN provides the air interface access method for User Equipment. A base station is referred to as Node B and control equipment for Node Bs is called a radio network controller (RNC). For an air interface, UMTS most commonly uses a wideband spread-spectrum mobile air interface known as wideband code division multiple access (or W-CDMA). W-CDMA uses a direct sequence code division multiple access signaling method (or CDMA) to separate users.

A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit switched and IP based packet switched traffic types. The RNC provides control functionalities for one or more Node Bs. Connectivity is provided between the UE (user equipment) and the core network by the UTRAN.

The UTRAN is connected internally or externally to other functional entities by four interfaces: Iu, Uu, Iub and Iur. The UTRAN is attached to a GSM core network via an external interface called Iu. A radio network controller (RNC) supports this interface. In addition, RNC manages a set of base stations called Node Bs through interfaces labeled Iub. The Iur interface connects two RNCs with each other. The UTRAN is largely autonomous from the core network since the RNCs are interconnected by the Iur interface. FIG. 1 discloses a communication system which uses the RNC, the Node Bs and the Iu and Uu interfaces. The Uu is also external and connects the Node B with the UE, while the Iub is an internal interface connecting the RNC with the Node B.

The RNC fills multiple roles. First, it may control the admission of new mobiles or services attempting to use the Node B. Second, from the Node B, i.e. base station, point of view, the RNC is a controlling RNC. Controlling admission ensures that mobiles are allocated radio resources (bandwidth and signal/noise ratio) up to what the network has available. It is where Node B's Iub interface terminates. From the UE, i.e. mobile, point of view, the RNC acts as a serving RNC in which it terminates the mobile's link layer communications.

From the core network point of view, the serving RNC terminates the Iu for the UE. The serving RNC also controls the admission of new mobiles or services attempting to use the core network over its Iu interface.

In the UMTS system, universal terrestrial radio access (UTRA) frequency division duplex (FDD) channels and UTRA time division duplex (TDD) channels may be used to communicate data. The communication link through which the user equipment sends signals to the Node B is called a uplink. Applying interference cancellation in Node Bs will allow them to receive transmissions at higher data rates, i.e., interference cancellation can increase data rates on the uplink. It can also increase capacity on the uplink.

The apparatuses and methods of the present patent application is directed to overcoming limitations of the prior art and providing improved memory design.

SUMMARY OF THE INVENTION

In view of the above, the described features of the present invention generally relate to one or more improved systems, methods and/or apparatuses for an improved memory design. In a first embodiment, the present patent application comprises a method and apparatus for cancelling traffic interference comprising means and instructions for storing data in an external memory; and processing the data on an internal memory, wherein the external memory is low bandwidth memory; the internal memory is high bandwidth on board cache, the data is incoming antenna samples and the interference is traffic interference.

In another embodiment, the method and apparatus further comprise means and instructions for caching portions of said data on the internal memory; refilling the internal memory by reading the newest data from the external low bandwidth memory and updating the internal memory; and writing the older data back to the external low bandwidth memory from the internal memory.

In another embodiment, the present patent application comprises a traffic interference memory manager, comprising an external low bandwidth memory, wherein data is stored, and an high bandwidth on board cache operably connected to the external memory, wherein the data is processed.

In another embodiment, the traffic interference memory manager further comprises a controller arbiter operably connected to the external low bandwidth memory, wherein accesses to the external low bandwidth memory are arbitrated, a cache arbiter operably connected to the high bandwidth on board cache, wherein accesses to the high bandwidth on board cache are arbitrated, and a cache update operably connected between the external low bandwidth memory and the high bandwidth on board cache, wherein the refilling of high bandwidth on board cache and the writing of the older data back to the external low bandwidth memory may be controlled.

Further scope of the applicability of the present method and apparatus will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein:

FIG. 2-1 is a high level block diagram of TIMM;

FIG. 2-2 illustrates data storage in QDRII and OBC for 4 Rx Antenna;

FIG. 2-3 illustrates memory organization for one QDRII implementation;

FIG. 2-4 illustrates a memory configuration of OBC across 4 banks for 4 Rx Antenna;

FIG. 4 is a portion of a communication system, including a radio network controller and a node B;

DETAILED DESCRIPTION

Figure 1:
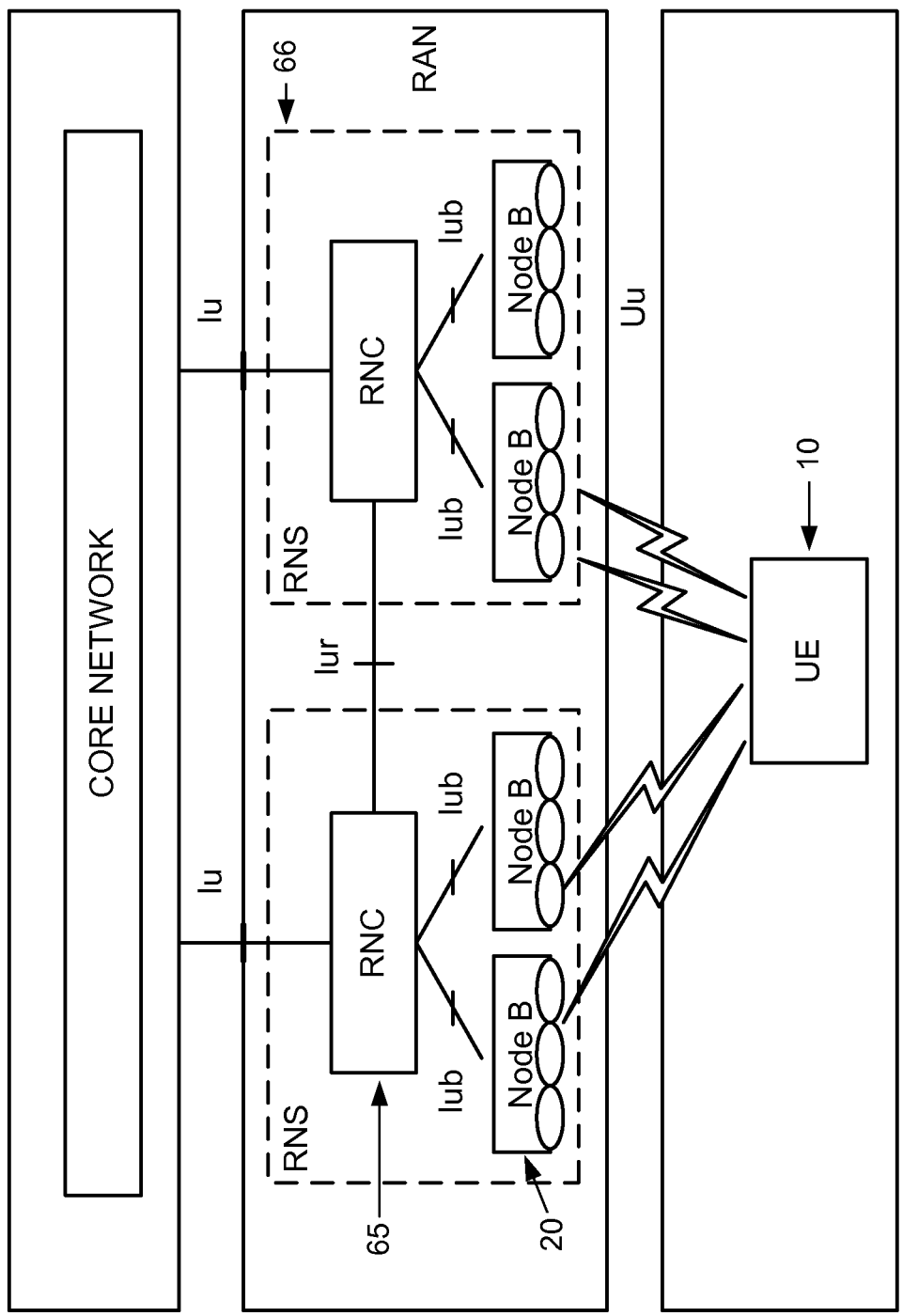
FIG. 1 is a block diagram of a radio access system having two radio network subsystems along with its interfaces to the core and the user equipment.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In a WCDMA system, canceling a successfully decoded user, reduces the interference seen during the demodulation of subsequent users and thus improves their chances of being decoded successfully. However, interference cancellation for WCDMA uses the storage of pervious transmissions of the user equipments (UEs) 10. This may lead to a large onboard storage requirement which may be prohibitive on some platforms which may not have enough memory to store all the previous attempts.

For example, as a user might not decode in the first attempt, all retransmissions may be stored to reattempt this user once other successful users have been cancelled. A large memory buffer may store up to 4 transmissions for 2 ms transmission time interval (TTI) enhanced users and 2 transmissions for 10 ms TTI enhanced users. (The transmission time interval (TTI) is the time interval for which the modulation, coding and spreading format is fixed). Additionally, dedicated 10 ms, 20 ms and 40 ms users may be supported by the method and apparatus disclosed in the present patent application. The present patent application will work with many different buffer sizes. It is noted that a dedicated user was initially specified in Release 99, while an enhanced user on the uplink was specified in Release 6 of the 3GPP standards. The 3rd Generation Partnership Project (3GPP) is a collaboration agreement that was established in December 1998. It is a co-operation between ARIB/TTC (Japan), ETSI (Europe), ATIS (North America), CCSA (China) and TTA (South Korea). The scope of 3GPP is to make a third generation (3G) mobile phone system specification within the scope of the ITU's IMT-2000 project globally applicable. 3GPP specifications are based on evolved GSM specifications, which are generally known as the UMTS system. 3GPP standards are structured as Releases. Discussion of 3GPP thus frequently refers to the functionality in one release or another. For example, release 99 specifies the first UMTS 3G networks, incorporating a CDMA air interface. Release 6 integrates operation with Wireless LAN networks and adds High Speed Uplink Packet Access (HUSPA). In one example, a Node B 20 uses the method and apparatus of the present patent application for interference cancellation.

Figures 1, 2:
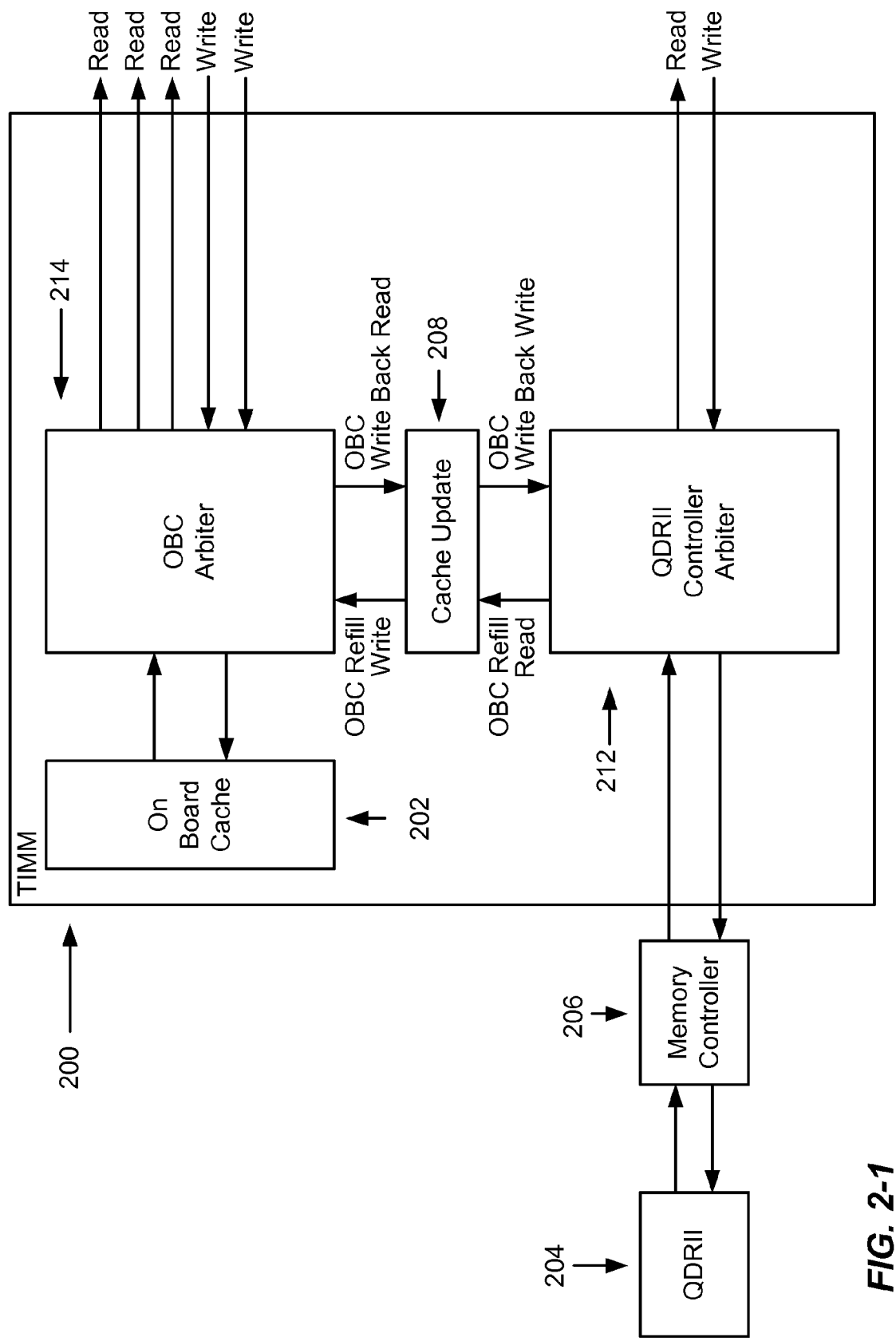
Figure 2:
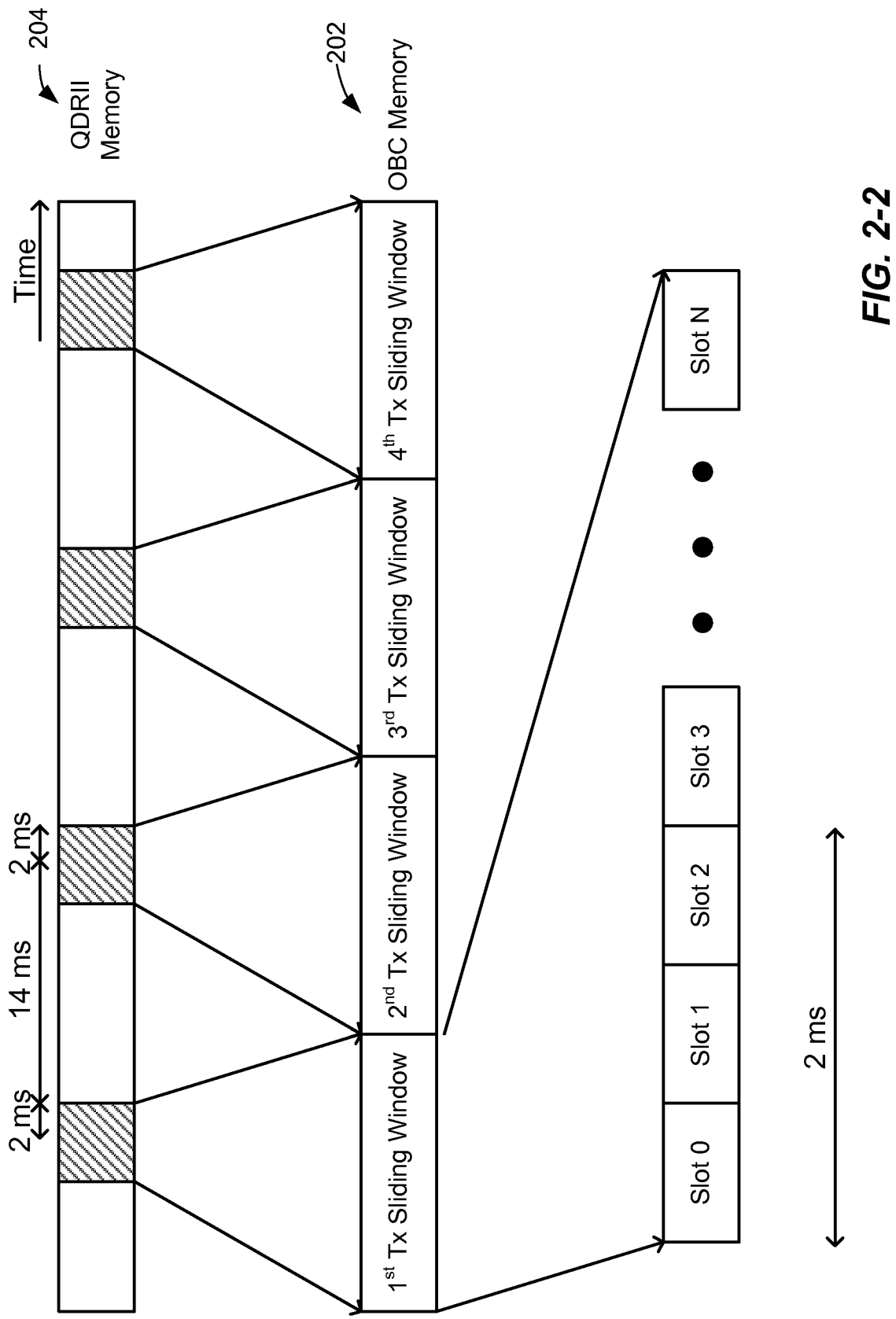

If all the memory used for storing prior transmissions may not be stored in a field programmable gate array (FPGA), the data may be stored in an external memory and TTI users may be processed out of an on board (internal) cache 202. The following FIG. 2-1 shows a high level block diagram of a traffic interference memory manager (TIMM) 200 implementing an apparatus and method of the present patent application. For example, when the total memory may not be stored in an FPGA, the data, such as incoming antenna samples, may stored in an external low bandwidth memory 204 and 2 ms TTI users are processed out of a high bandwidth on board cache 202. An example of external low bandwidth memory 204 is shown as quad data rate II (QDRII) memory in FIG. 2-1. (Other types of external memory may also be used beside QDRII memory). This QDRII memory is large enough to hold the entire waveform for each input antenna 318 for the relevant timeframe. A memory controller 206 may be used to control writing of data into and reading of data from external memory. Such a memory controller is shown in FIG. 2-1.

A high bandwidth internal memory 202 may be used for data demodulation and cancellation as multiple accesses are made to the same on board (internal) memory 202. This internal memory is identified as On Board Cache 202 in FIG. 2-1. The internal high bandwidth memory 202 stores just the portions of the waveform data required for the processing of UEs 10 in the current transmission time. As interference cancellation uses a large portion of waveform data to be stored, this storage is done externally in a low bandwidth, less expensive memory 204 when compared to the faster, on board memory 202. The accesses into this external memory 204 is for writing in incoming antenna 318 data and for updating the on board (internal memory) cache 202. The internal high bandwidth cache 202 is designed to hold the waveform samples used to demodulate UE 10 transmissions and perform cancellation when possible. For example, this internal memory 202 may comprise memory macros useable in the FPGAs for an implementation on an FPGA platform.

Thus, this external memory 204 may be a low bandwidth (i.e., low speed) memory. For example, if 2 ms TTI UEs are being decoded with a maximum of 4 transmissions per user, the waveform data will be updated from the external memory 204 to the internal memory 202 4 times.

The incoming antenna 318 samples for WCDMA are stored in an external low bandwidth memory 204. The portions of data required for current processing are cached on an internal high bandwidth memory 202. This enables the hardware blocks of the TIMM 200 that use this data to have access to the relevant pieces of information without having to store the entire memory. The relevant pieces of the waveform that is stored internally is determined by the transmission time intervals (TTI) of the UEs 10 in the current processing time. The method of the present patent application reduces silicon cost by reducing the amount of onboard memory 202 because external low bandwidth memory is less expensive. On some platforms in the prior art, interference cancellation may not be fully implemented as the available onboard memory is insufficient to hold the entire waveform.

Figure 3A:
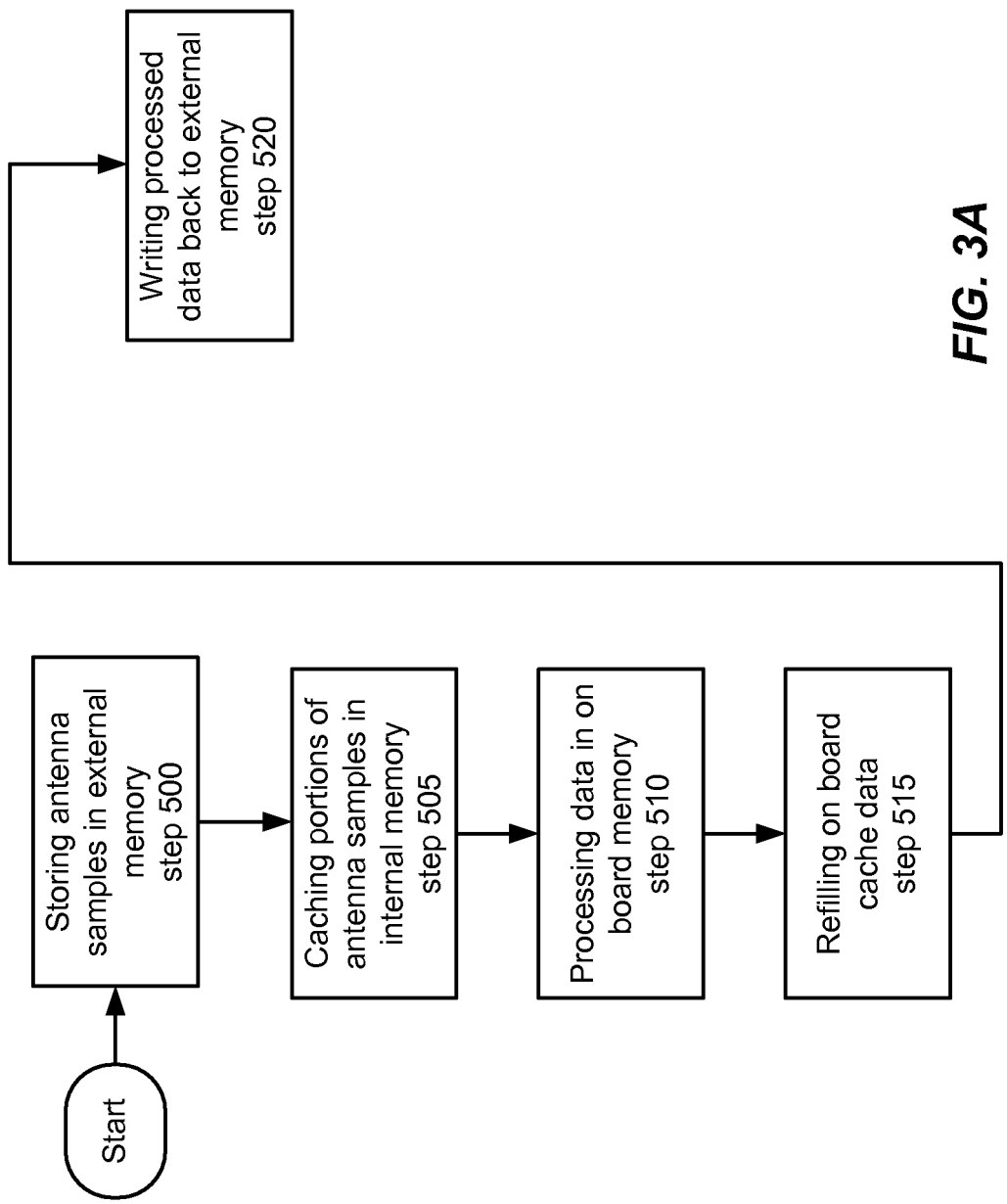
FIG. 3A is a flow diagram illustrating the steps executed when using both external and internal memory to store and process data during interference cancellation.

FIG. 3A is a flowchart of the steps discussed above when using external and on board memory for interference cancellation. The incoming antenna 318 samples for WCDMA are stored in an external low bandwidth memory 204 (Step 500). The portions of data required for current processing are cached on an internal high bandwidth memory 202 (Step 505). The cached TTI user data is processed out of an on board (internal) cache 202 (Step 510). (In one example, the cached data is 2 ms TTI user data).

The UTRA FDD channels may be segmented into radio frames and slots. Each radio frame has a length of 10 msec. The radio frames are again divided into 15 slots, labeled 0 to 14, of 666.67 microsec or 2560 chips for each slot. That is, each slot represents 2560 chips. In FIGS. 2-2, the QDRII memory 204 is accessed to write back and refill the OBC cache 202 periodically. In one example, QDRII memory 204 is accessed to write back and refill the OBC cache 202 every 256 chips or 10 times per slot according to FIG. 2-2.

Depending on the data used for interference cancellation, the on board cache 202 data gets refilled and written back to the larger external memory 204, QDRII memory, on a periodic basis. One example is to have the internal memory 202 updated in a sliding window fashion. The oldest data is written back into the external memory 204 from the cache 202 while the newest data is read from the external memory 204 and updated into cache 202. The granularity of the update can be programmable. Use of a cache update 208 as shown in FIG. 2-1 may be used to control the refilling of on board cache 202 and the writing of older data back to external memory 204. It may also be used to help program the above stated process.

These steps are also illustrated in FIG. 3A, where step 515 involves refilling on board cache 202 data by reading newest data from the external memory 204 and updating the cache 202. Next, processed data is written back to the external QDRII memory 204 from the on board cache 202 (step 520).

FIG. 2-2 illustrates data storage in QDRII (external) memory 204 and on board cache (OBC) 202 or internal memory for 4 receive (Rx) antennae 318. Other configurations such as a 1 or 2 antenna 318 configuration may be implemented using the method and apparatus of the present patent application. In FIG. 2-2, the sliding transmit windows 1-4 ($1^{st}$ Tx Sliding Window—$4^{th}$ Tx Sliding Window) are used to retrieve data from the QDRII (external) memory 204 for four receive antennae 318 respectively.

Figures 2, 3:
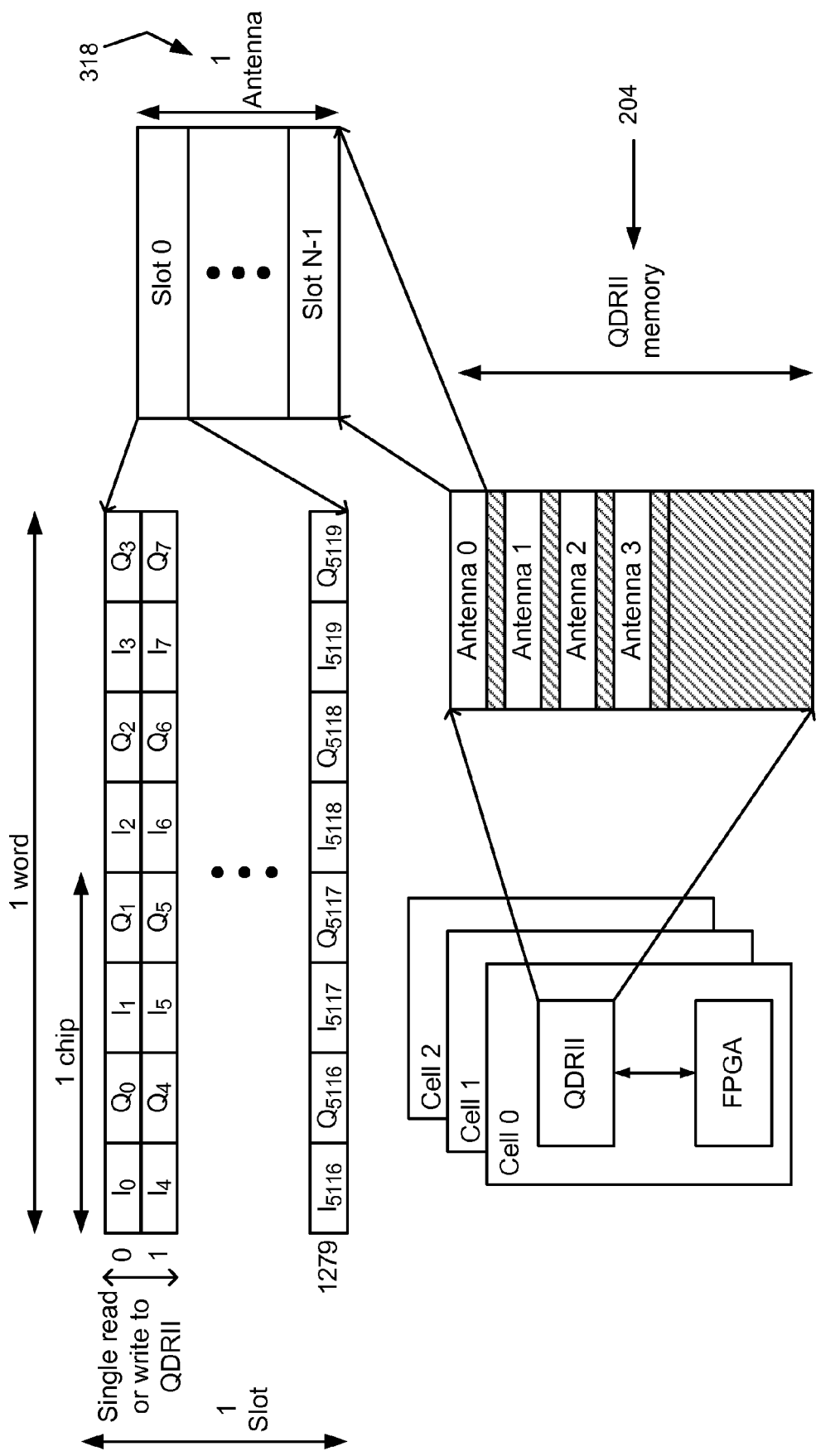

FIG. 2-3 below shows the memory storage when one QDRII device 204 is used. There may be other examples where multiple QDRII devices 204 may be used. In FIG. 2-3, the QDRII 204 stores N slots per antenna 318 of data, labeled 0 to N−1. It is noted that different numbers of slots may be used. The number of slots may vary due to splitting of memory across multiple, e.g., two, FPGAs).

As stated earlier, the QDRII (external) memory 204 acts as the external store of the received data. It stores up to N slots worth of data for one antenna 318, antennae 0-3. The greyed in area shown in FIG. 2-3 is unused portions of the QDRII memory 204. It is used in FIG. 2-3 to simplify addressing so that each antenna 318 starts on a multiple of 2 addressing boundary. However, in other examples, all antenna 318 data may be put together.

In this example, this QDRII memory 204 is accessed to write back and refill the OBC cache 202 every 256 chips time. Thus, memory is accessed to write back and refill the OBC cache 202 every 256 chips. It may also be the interface for processing enhanced 10 ms users as well as dedicated 10 ms, 20 ms and 40 ms users. The bandwidth to the QDRII memory 204 may not be as large as that for the OBC 202 and thus may not support ports at the same bandwidth as the OBC 202. Thus, lower powered ports may be designed to run in parallel to the 2 ms users.

Note that when the hardware is replicated to process the paths in parallel, one read from QDRII 204 may be used to support all paths. On the cancellation, a composite cancellation waveform for all paths is generated and cancelled at once. Note that if dedicated users are present, they are processed in the same fashion as 10 ms enhanced users. Note that they may also be processed in 2 ms segments. A 10 ms dedicated user is only using half of a 10 ms enhanced or E-user's bandwidth. Similarly, a 20 ms and 40 ms dedicated user is using the same as and twice as much bandwidth as a 10 ms E-user respectively. This is because the enhanced users may have up to two transmissions while the dedicated users may use one transmission.

High Bandwidth and High Availability Memory 202 Design for Interference Cancellation As stated earlier, the present patent application discloses applying time interference cancellation to WCDMA. Previous designs processed waveform data directly as it arrived and stored the demodulated data and combined data symbols. Since this is a smaller amount of data than storing the raw antenna 318 waveform, previous designs may not have stored large amounts of data. There are now additional interference cancellation blocks in addition to the data demodulator block that access the waveform. In the method and apparatus of the present patent application, the raw waveform may be stored as well. Additionally, in interference cancellation, the antenna 318 waveform is used to perform cancellation and any further re-attempts at data demodulation.

High Bandwidth, High Availability, on Board (Internal) Cache 202

As discussed earlier, an internal cache of 4 transmissions of 2 ms TTI users may be stored within the FPGA. The data for users being processed in a specific TTI is present in the cache 202. If the cache 202 will not fit into one FPGA, the data maybe split into MSB and LSB half words and stored in two different FPGAs. The cache 202 may also be specific for a cell within a Node B 20. That is, the data may also be divided into multiple cells (e.g., 3 cells) with multiple FPGAs (e.g., a pair of FPGAs for each cell) processing one cell of data.

As discussed above, a high bandwidth memory 202 may be used for data demodulation and interference cancellation in a WCDMA node B 20. In addition, the stored waveform may have high availability for the many users of the same data. In one example, this apparatus and method may provide a wide data bus for high bandwidth in which the antenna 318 data is striped across a banked structure of memory so that users accessing that memory have a low wait time if there is an address conflict. For ports accessing contiguous data, there is minimal interruption to the data flow once it has started. This means the port design may be simplified.

The high bandwidth, high availability memory 202 may be designed with arbitration for multiple access ports. A wide data bus and a pipelined architecture enables a high bandwidth access on each port. Pipelined as used here means doing back to back accesses to the memory such that the read and write ports are always active. There may be minimal dead cycles in the access.

The memory may be split into multiple banks 210 and the waveform data may be striped across these banks 210. When a port accesses contiguous data, the port moves bank 210 to bank 210 and may roll over in a circular fashion. This port blocks access to any bank 210 for only a fixed amount of time. This blocking of access may be done by a memory arbiter. This fixed amount of time may become the minimum time that another port may have to wait to get access to this bank 210. At a minimum, there may be the same number of banks as there are access ports. This results in the worst case delay to be the fixed access time to any bank 210. Thus, if there is a bank 210 collision between two ports for contiguous data access, one port may wait this fixed delay. For contiguous data access, data may be available after this initial delay.

Figure 3B:
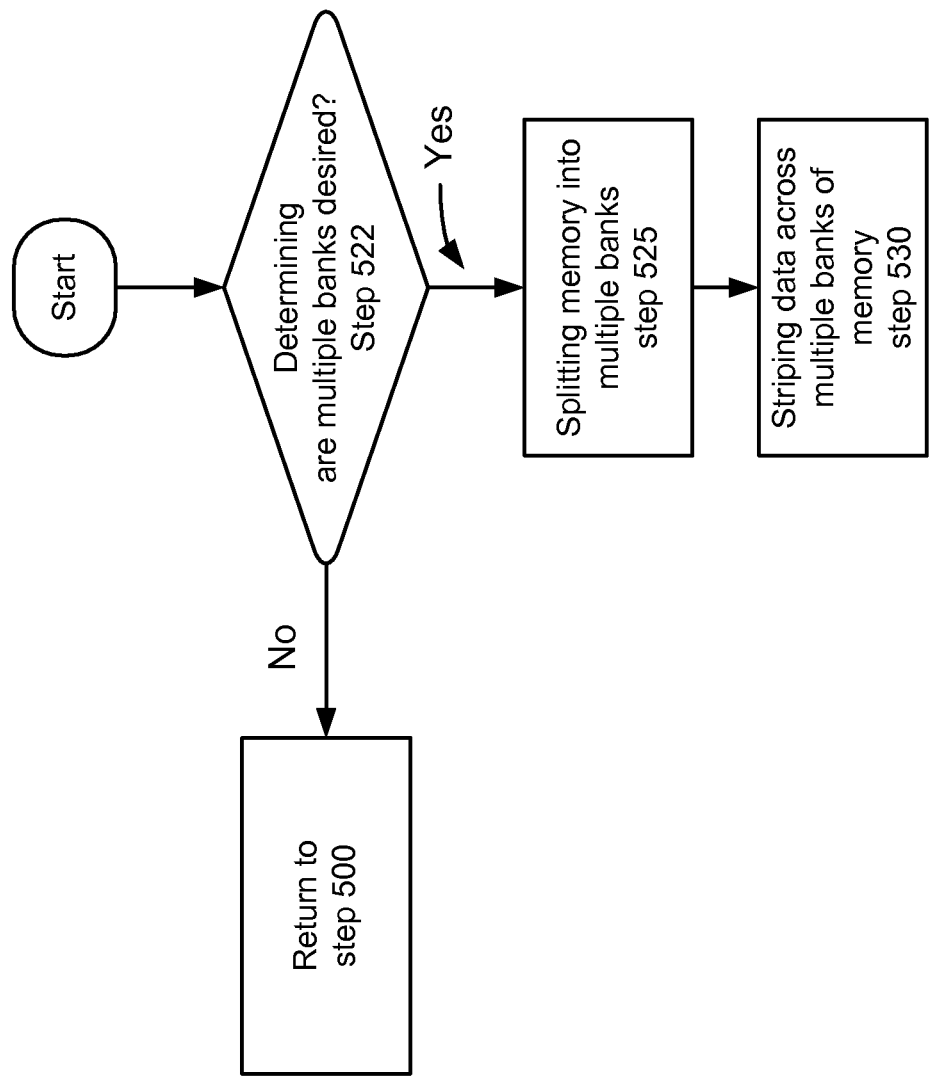
FIG. 3B is a flow diagram illustrating the steps executed when using both external and internal memory with multiple banks to store and process data during interference cancellation.
Figure 4:
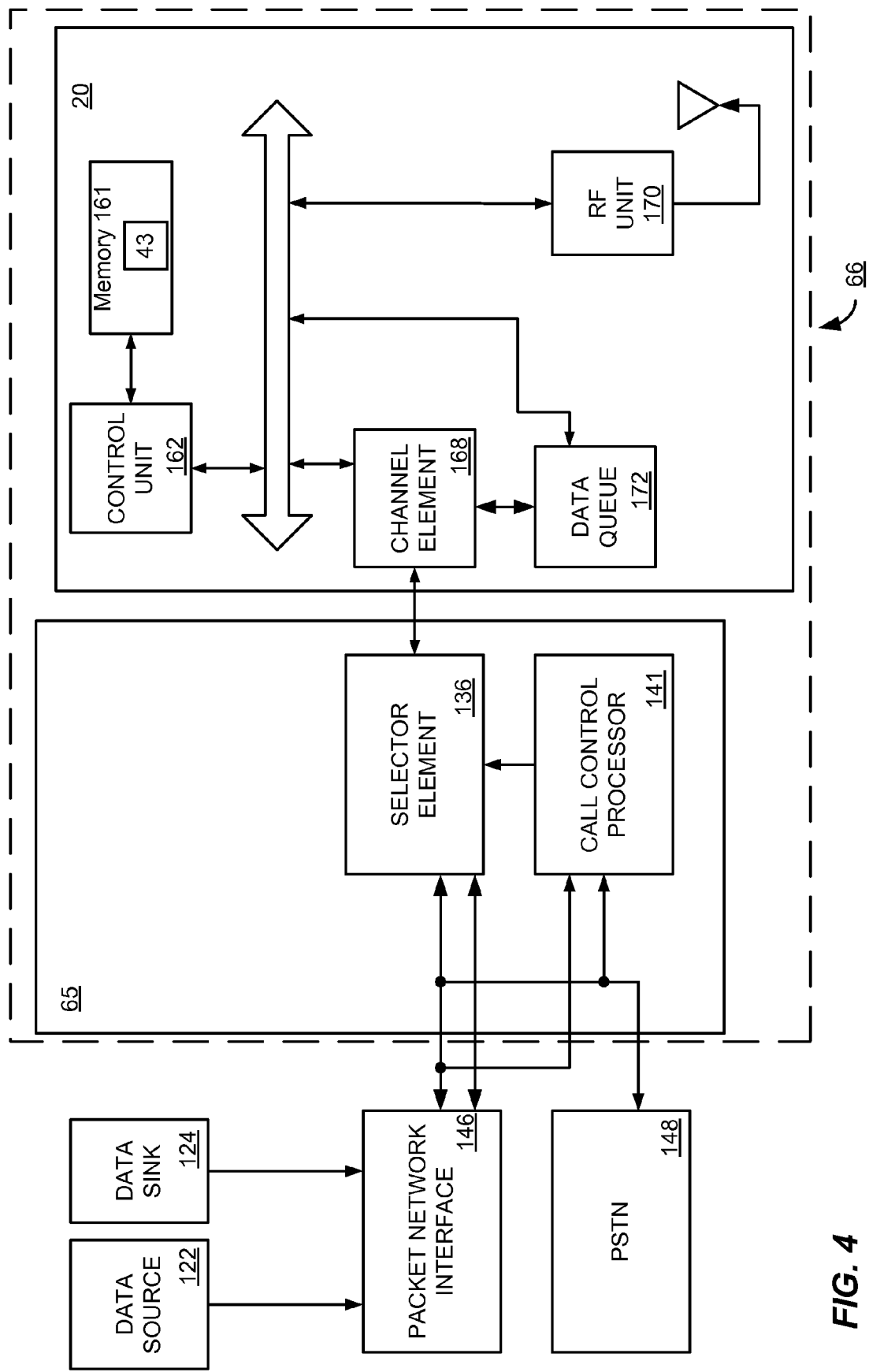

Getting back to the flowchart, these steps are also illustrated in FIG. 3B, where step 522 asks "are multiple banks 210 desired?" If yes, step 525 involves splitting the memory into multiple banks 210. Next, waveform data is striped across these banks 210 (step 530).

The ports accessing this memory may use high bandwidth and high availability. This method and apparatus of the present patent application may provide both a simple banked, data striped and pipelined architecture. The ports accessing data may now have a deterministic delay for data access. Once they have access to contiguous data, there may be minimal stalling. Thus the port design may be simplified. For example, the state machine may be simpler if the port does not have to deal with stalls in the middle of a data access. The high bandwidth also may enable more users to be processed in the node B 20 for a given time.

Figures 2, 3, 4:
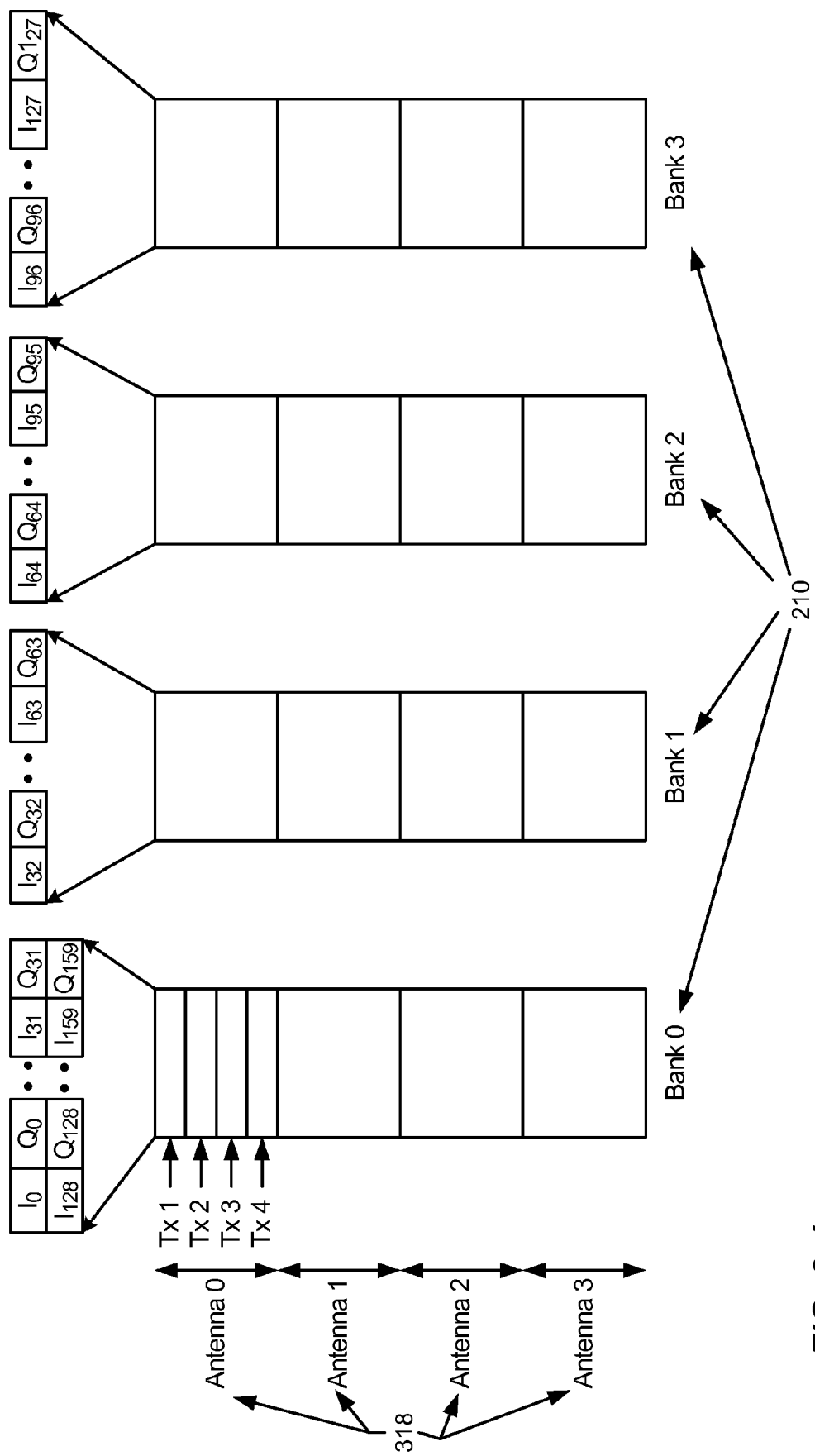

In one example, 2 ms TTI users are processed out of the onboard memory, OBC 202. To get higher bandwidth, the data is striped across all 4 banks 210 of the OBC 202 such that the ports may access the data in parallel. Thus, the OBC 202 is divided into 4 banks 210. Therefore, there may be 4 ports accessing the OBC 202 at the same time. The striping of the data means that one port may not access the same bank 210 on consecutive memory accesses, the port may have to move to the next bank 210 on the next clock cycle. Thus, any one bank 210 may not be blocked for more than one cycle by any one port. FIG. 2-4 below shows the memory organization for 4 antennae 318. It is noted that the number of antennas 318 stored and bit widths and size of memory may vary with different implementations.

In FIG. 2-4, Tx1, Tx2, Tx3 and Tx4 represent the 4 transmissions for the 2 ms TTI cache. FIG. 2-4 shows how the transmissions and antennae are partitioned in the OBC memory 202. Tx1 for Ant 0 and Tx1 for Ant 1 till Tx 1 for Ant 3 are the slots per tx sliding window in FIG. 2-2.

Bandwidth Access to OBC Cache Update

A number of successfully decoded users may be cancelled out of the OBC 202. This cancelled waveform may be stored back into the QDRII memory 204 to be re-used when a later transmission is processed. In one example, as a sliding window of data is implemented at the OBC, 256 chips per transmission is written back to the QDRII memory 204. In this example, the cache 202 is then refilled with the next 256 chips per transmission from the QDRII memory 204. Thus, the entire OBC memory 202 in this example may not be exchanged entirely, just 256 chips at a time. In one example, the granularity of the write back and refill may be 256 chips and the accesses may be completed within the 256 chip time. Note that the "older" 256 chips is written back from the OBC 202 to the QDRII 204 and the "younger" or new 256 chips is read from the QDRII 204 and written into the OBC 202 (see FIG. 2-2) with time moving from left to right. This may create a sliding window of samples for processing.

The QDRII Controller Arbiter 212 shown in FIG. 2-1 may be used to arbitrate traffic in the form of accesses to the QDRII memory 204 for multiple write and read ports. In one example, it might handle multiple write and read ports. Ports may provide a start data address, an antenna 318 number and a number of chipx2 samples to the QDRII Controller Arbiter 212. Other addressing means may also be used.

The On Board Cache (OBC) Arbiter 214 shown in FIG. 2-1 may be used to control traffic in the form of arbitrating accesses to the OBC 202 for multiple write and read ports. In one example, it might handle multiple write and read ports. Ports may provide a start sample address, an antenna 318 number and a number of chipx2 samples to the OBC 202.

Communication systems may use a single carrier frequency or multiple carrier frequencies. Each link may incorporate a different number of carrier frequencies. Furthermore, an access terminal 10 may be any data device that communicates through a wireless channel or through a wired channel, for example using fiber optic or coaxial cables. An access terminal 10 may be any of a number of types of devices including but not limited to PC card, compact flash, external or internal modem, or wireless or wireline phone. The access terminal 10 is also known as user equipment (UE), a remote station, a mobile station or a subscriber station. Also, the UE 10 may be mobile or stationary.

User equipment 10 that has established an active traffic channel connection with one or more Node Bs 20 is called active user equipment 10, and is said to be in a traffic state. User equipment 10 that is in the process of establishing an active traffic channel connection with one or more Node Bs 20 is said to be in a connection setup state. User equipment 10 may be any data device that communicates through a wireless channel or through a wired channel, for example using fiber optic or coaxial cables. The communication link through which the user equipment 10 sends signals to the Node B 20 is called a uplink. The communication link through which an NodeB 20 sends signals to a user equipment 10 is called a downlink.

FIG. 4 is detailed herein below, wherein specifically, a Node B 20 and radio network controller 65 interface with a packet network interface 146. The Node B 20 and radio network controller 65 may be part of a radio network server (RNS) 66, shown in FIG. 1 and in FIG. 4 as a dotted line surrounding one or more Node Bs 20 and the radio network controller 65. The associated quantity of data to be transmitted is retrieved from a data queue 172 in the Node B 20 and provided to the channel element 168 for transmission to the remote station 10 associated with the data queue 172.

Radio network controller 65 interfaces with packet network interface 146, Public Switched Telephone Network (PSTN) 148, and all Node Bs 20 in the communication system 100 (only one Node B 20 is shown in FIG. 4 for simplicity). Radio network controller 65 coordinates the communication between remote stations 10 in the communication system and other users connected to packet network interface 146 and PSTN 148. PSTN 148 interfaces with users through a standard telephone network (not shown in FIG. 4).

Radio network controller 65 contains many selector elements 136, although only one is shown in FIG. 4 for simplicity. Each selector element 136 is assigned to control communication between one or more Node B's 20 and one remote station 10 (not shown). If selector element 136 has not been assigned to a given user equipment 10, call control processor 141 is informed of the need to page the remote station. Call control processor 141 then directs Node B 20 to page the remote station 10.

Data source 122 contains a quantity of data, which is to be transmitted to a given remote station 10. Data source 122 provides the data to packet network interface 146. Packet network interface 146 receives the data and routes the data to the selector element 136. Selector element 136 then transmits the data to Node B 20 in communication with the target remote station 10. In the exemplary embodiment, each Node B 20 maintains a data queue 172, which stores the data to be transmitted to the remote station 10.

For each data packet, channel element 168 inserts the necessary control fields. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 10, the downlink signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at Node B 20, specifically the de-interleaving, decoding, and CRC check functions. The decoded data is provided to a data sink.

Figure 5:
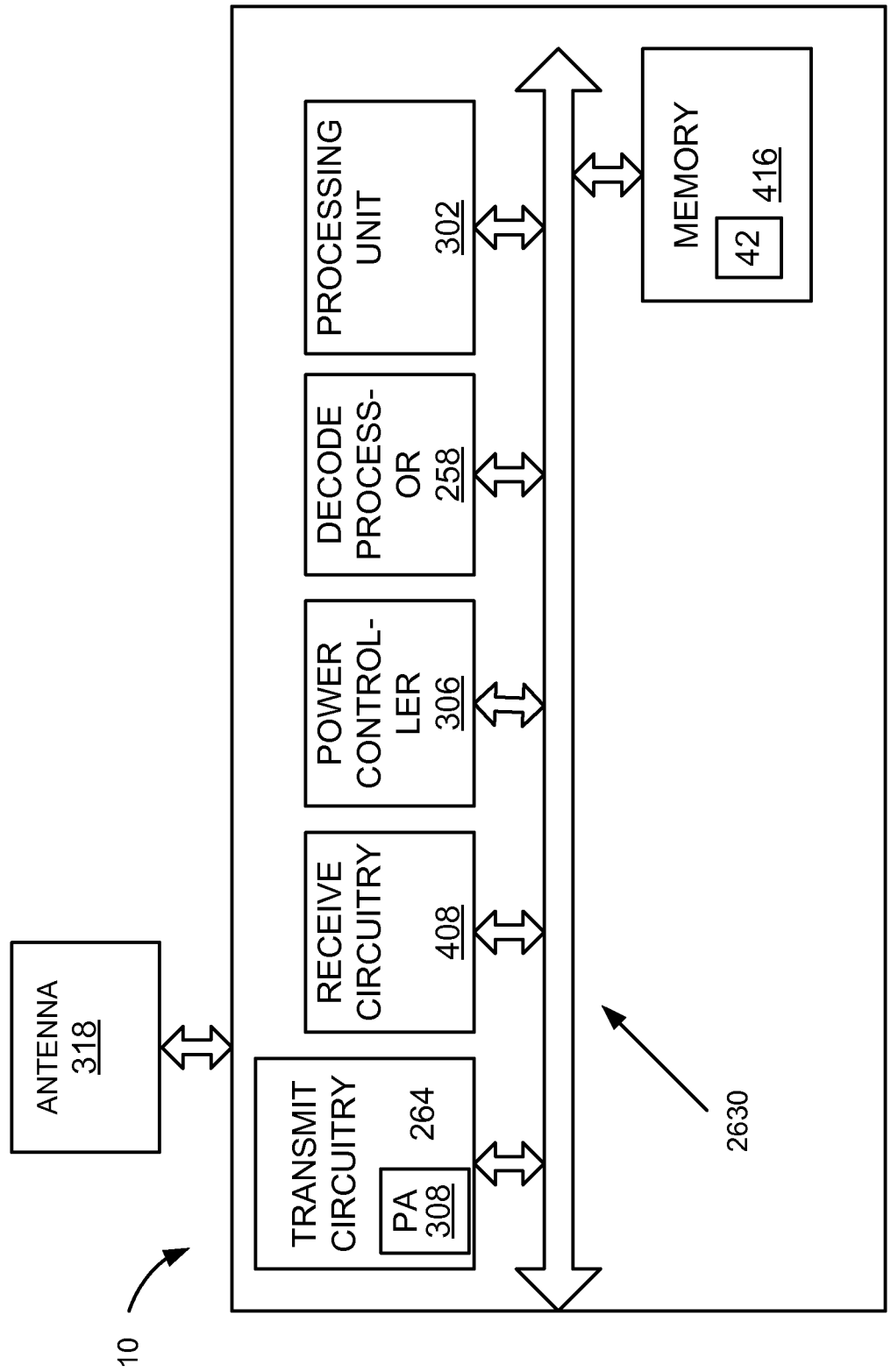
FIG. 5 illustrates an embodiment of user equipment according to the present patent application.

FIG. 5 illustrates an embodiment of a UE 10 according to the present patent application in which the UE 10 includes transmit circuitry 264 (including PA 308), receive circuitry 408, throttle control 306, decode process unit 258, processing unit 302, and memory 416.

The processing unit 302 controls operation of the UE 10. The processing unit 302 may also be referred to as a CPU. Memory 416, which may include both read-only memory (ROM) and random access memory (RAM), provides instructions and data to the processing unit 302. A portion of the memory 416 may also include non-volatile random access memory (NVRAM).

The UE 10, which may be embodied in a wireless communication device such as a cellular telephone, may also include a housing that contains a transmit circuitry 264 and a receive circuitry 408 to allow transmission and reception of data, such as audio communications, between the UE 10 and a remote location. The transmit circuitry 264 and receive circuitry 408 may be coupled to an antenna 318.

The various components of the UE 10 are coupled together by a bus system 2630 which may include a power bus, a control signal bus, and a status signal bus in addition to a data bus. However, for the sake of clarity, the various busses are illustrated in FIG. 8 as the bus system 2630. The UE 10 may also include a processing unit 302 for use in processing signals. Also shown are a power controller 306, a decode processor 258, and a power amplifier 308.

Figure 6A:
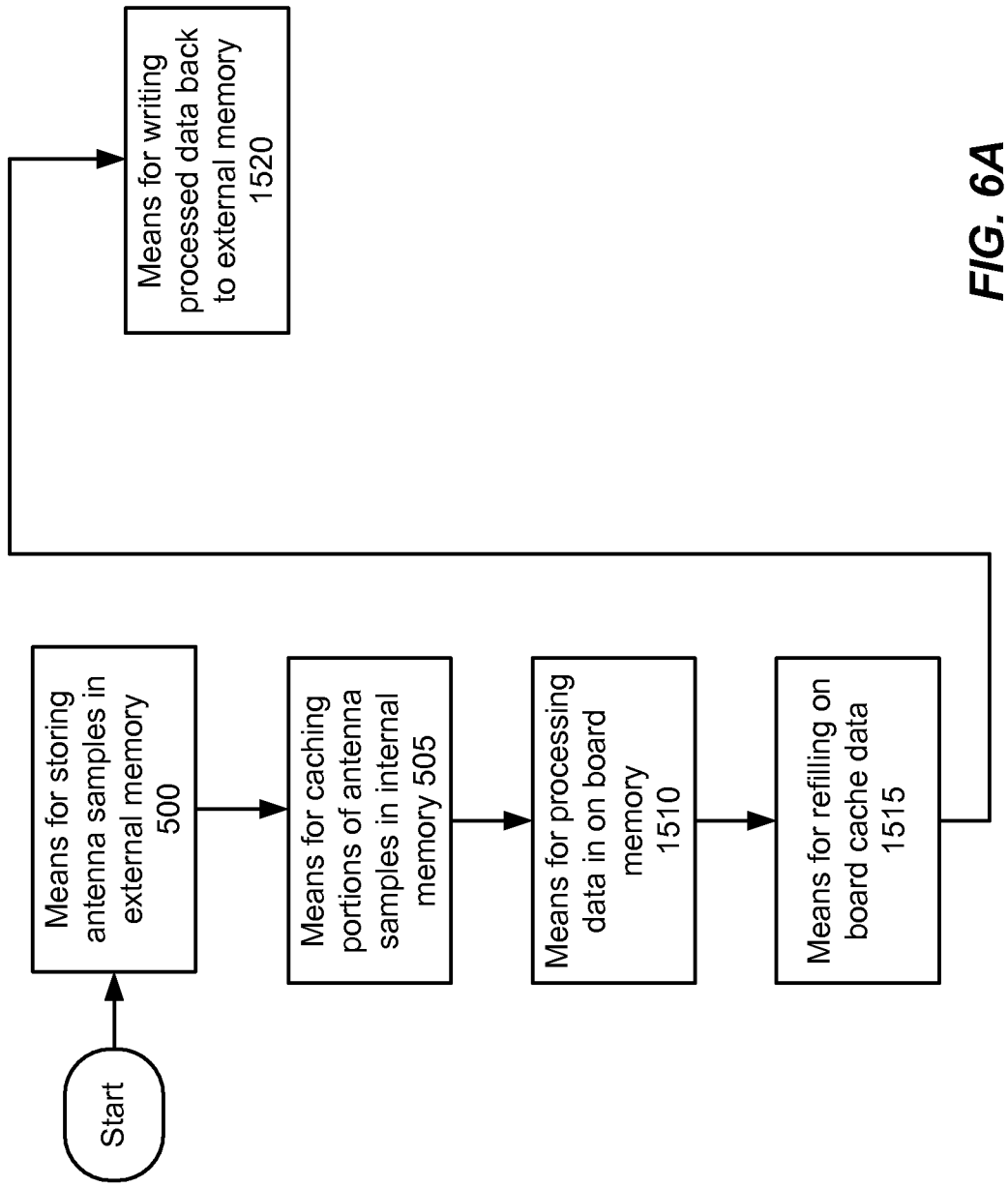
FIG. 6A is a functional block diagram illustrating the steps that are executed when using both external and internal memory to store and process data during interference cancellation.
Figure 6B:
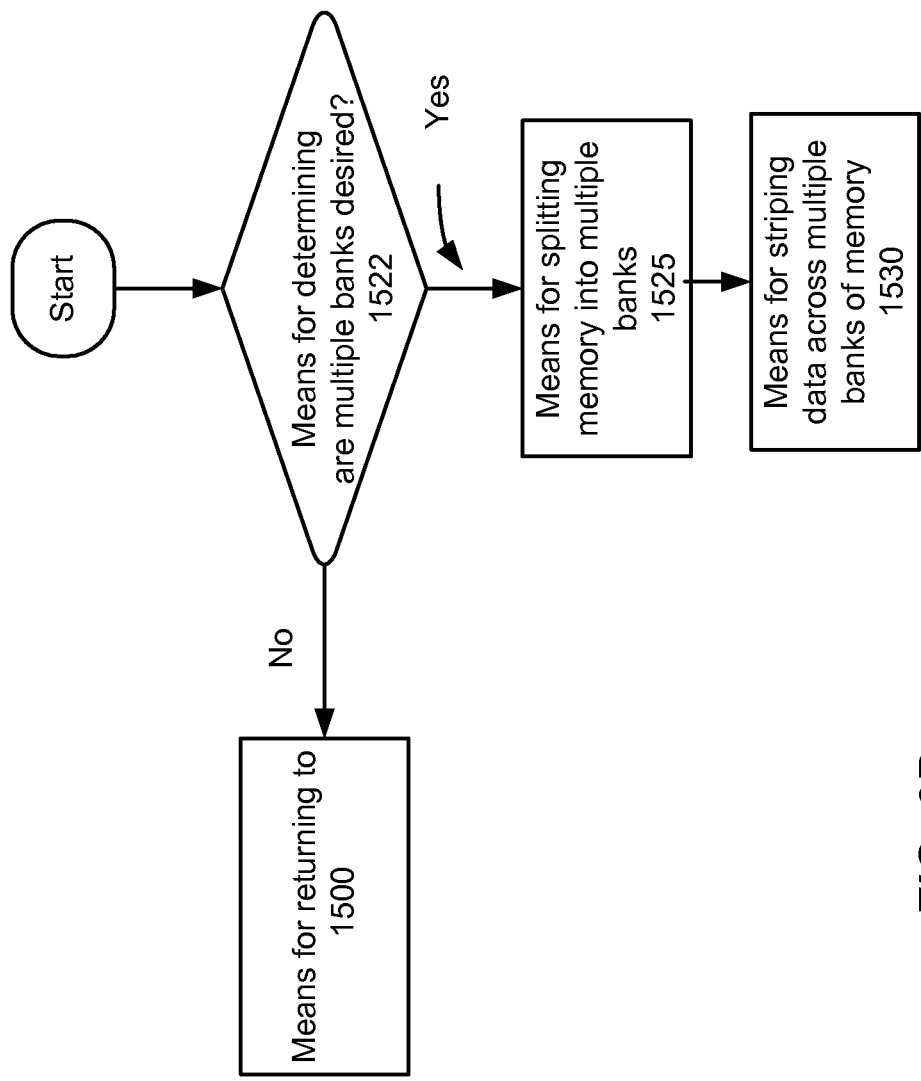
FIG. 6B is a functional block diagram illustrating the steps executed when using both external and internal memory with multiple banks to store and process data during interference cancellation.

The methods and apparatuses of FIGS. 3A and 3B described above are performed by corresponding means plus function blocks illustrated in FIGS. 6A and 6B. In other words, steps 500, 505, 510, 515, 520, 522, 525 and 530 in FIGS. 3A and 3B correspond to means plus function blocks 1500, 1505, 1510, 1515, 1520, 1522, 1525 and 1530 in FIGS. 6A and 6B.

The steps illustrated in FIGS. 3A, 3B, 5A and 5B may be stored as instructions in the form of software or firmware 43 located in memory 161 in the Node B 20. These instructions may be executed by the control unit 162 of the Node B 20 in FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Therefore, the present invention is not to be limited except in accordance with the following claims.

The invention claimed is:

1. A method of cancelling interference, comprising:
storing data in an external memory, wherein the data comprises received raw waveform data of incoming antenna samples of transmissions from a plurality of user equipments having different transmission time intervals, and the external memory comprises a plurality of slots for storing in-phase and quadrature sinusoidal component pairs of the received raw waveform data of incoming antenna samples of transmissions corresponding to each of a plurality of receive antennas starting on a multiple of 2 addressing boundary of the external memory; and
processing the data on an internal memory, the processing comprising
determining and caching portions of the data corresponding to each of the plurality of receive antennas to be processed on the internal memory by retrieving portions of the received raw waveform data from the external memory according to a plurality of sliding windows, wherein each sliding window corresponds to a respective one of the plurality of receive antennas, and the portions of the data to be processed comprise portions of the raw waveform data corresponding to at least one of the plurality of user equipments in a current transmission time interval,
refilling the internal memory by reading new data from the external memory and updating the internal memory according to the plurality of sliding windows corresponding to the plurality of receive antennas,
storing processed data to the external memory from the internal memory according to the plurality of sliding windows, wherein the processed data comprises a canceled waveform corresponding to at least one successfully decoded one of the transmissions, and
processing another transmission using the canceled waveform for each of the plurality of user equipments having different transmission time intervals.

2. The method of cancelling interference according to claim 1, wherein the external memory includes a low bandwidth memory, said internal memory includes high bandwidth on board cache, and the interference includes traffic interference.

3. The method of canceling interference according to claim 2, further comprising arbitrating accesses to the low bandwidth memory.

4. The method of canceling interference according to claim 2, further comprising arbitrating accesses to the high bandwidth on board cache.

5. The method of canceling interference according to claim 1, further comprising:
determining that multiple banks of memory are desired;
splitting the internal memory into the multiple banks of memory;
preventing consecutive memory accesses via a port to a same bank of memory; and
configuring the port to access a different bank of memory on a subsequent clock cycle.

6. The method of canceling interference according to claim 5, wherein the waveform data is striped such that ports access the waveform data in parallel.

7. The method of canceling interference according to claim 1, wherein the refilling occurs every 256 chips.

8. The method of canceling interference according to claim 1, wherein the storing is performed periodically.

9. A means for canceling interference, comprising:
means for storing data in an external memory, wherein the data comprises received raw waveform data of incoming antenna samples of transmissions from a plurality of user equipments having different transmission time intervals, and the external memory comprises a plurality of slots for storing in-phase and quadrature sinusoidal component pairs of the received raw waveform data of incoming antenna samples of transmissions corresponding to each of a plurality of receive antennas starting on a multiple of 2 addressing boundary of the external memory; and
means for processing the data on an internal memory, the means for processing comprising:
means for determining and caching portions of the data corresponding to each of the plurality of receive antennas to be processed on the internal memory by retrieving portions of the received raw waveform data from the external memory according to a plurality of sliding windows, wherein each sliding window corresponds to a respective one of the plurality of receive antennas, and the portions of the data to be processed comprise portions of the raw waveform data corresponding to at least one of the plurality of user equipments in a current transmission time interval;

means for refilling the internal memory by reading new data from the external memory and updating the internal memory according to the plurality of sliding windows corresponding to the plurality of receive antennas, means for storing processed data to the external memory from the internal memory according to the plurality of sliding windows, wherein the processed data comprises a canceled waveform corresponding to at least one successfully decoded one of the transmissions, and means for processing another transmission using the canceled waveform for each of the plurality of user equipments having different transmission time intervals.

10. The means for canceling interference according to claim 9, wherein the external memory includes a low bandwidth memory, said internal memory includes a high bandwidth on board cache, and the interference includes traffic interference.

11. The means for canceling interference according to claim 10, further comprising:
means for determining that multiple banks of memory are desired;
means for splitting the internal memory into the multiple banks of memory;
means for preventing consecutive memory accesses via a port to a same bank of memory; and
means for configuring the port to access a different bank of memory on a subsequent clock cycle.

12. The means for canceling interference according to claim 11, wherein the waveform data is striped such that ports access the waveform data in parallel.

13. The means for canceling interference according to claim 10, further comprising means for arbitrating accesses to the low bandwidth memory.

14. The means for canceling interference according to claim 10, further comprising means for arbitrating accesses to the high bandwidth on board cache.

15. The means for canceling interference according to claim 9, wherein the means for refilling occurs every 256 chips.

16. The means for canceling interference according to claim 9, wherein the means for storing is performed periodically.

17. A traffic interference memory manager (TIMM), comprising:
an external memory for storing data comprising received raw waveform data of incoming antenna samples of transmissions from a plurality of user equipments having different transmission time intervals, the external memory comprising a plurality of slots for storing in-phase and quadrature sinusoidal component pairs of the received raw waveform data of incoming antenna samples of transmissions corresponding to each of a plurality of receive antennas starting on a multiple of 2 addressing boundary of the external memory; and
an internal memory operably connected to the external memory, wherein the data is processed by:
determining and caching portions of the data corresponding to each of the plurality of receive antennas to be processed on the internal memory by retrieving portions of the received raw waveform data from the external memory according to a plurality of sliding windows, wherein each sliding window corresponds to a respective one of the plurality of receive antennas, and the portions of the data to be processed comprise portions of the raw waveform data corresponding to at least one of the plurality of user equipments in a current transmission time interval,
refilling the internal memory by reading new data from the external memory and updating the internal memory according to the plurality of sliding windows corresponding to the plurality of receive antennas,
storing processed data to the external memory from the internal memory according to the plurality of sliding windows, wherein the processed data comprises a canceled waveform corresponding to at least one successfully decoded one of the transmissions, and
processing another transmission using the canceled waveform for each of the plurality of user equipments having different transmission time intervals.

18. The traffic interference memory manager according to claim 17, wherein the external memory includes a low bandwidth quad data rate II memory.

19. The traffic interference memory manager according to claim 17, wherein the internal memory includes high bandwidth on board cache and the external memory includes a low bandwidth memory.

20. The traffic interference memory manager according to claim 19, wherein the high bandwidth on board cache stores portions of waveform data.

21. The traffic interference memory manager according to claim 19, wherein the external low bandwidth memory comprises N slots of data.

22. The traffic interference memory manager according to claim 19, further comprising a controller arbiter operably connected to the external low bandwidth memory, wherein accesses to the external low bandwidth memory are arbitrated.

23. The traffic interference memory manager according to claim 19, further comprising a cache arbiter operably connected to the high bandwidth on board cache, wherein accesses to the high bandwidth on board cache are arbitrated.

24. The traffic interference memory manager according to claim 19, further comprising:
a controller arbiter operably connected to the external low bandwidth memory, wherein accesses to the external low bandwidth memory are arbitrated;
a cache arbiter operably connected to the high bandwidth on board cache, wherein accesses to the high bandwidth on board cache are arbitrated; and
a cache update operably connected between the external low bandwidth memory and the high bandwidth on board cache.

25. The traffic interference memory manager according to claim 24, further comprising:
a memory controller operably connected between the controller arbiter and the external low bandwidth memory.

26. The traffic interference memory manager according to claim 24, wherein the cache update comprises instructions to update the high bandwidth on board cache in a sliding window fashion.

27. The traffic interference memory manager according to claim 24, wherein the cache update further comprises instructions to:
determine that multiple banks of memory are desired;
split the high bandwidth on board cache into the multiple banks of memory;
prevent consecutive memory accesses via a port to a same bank of memory; and
configure the port to access a different bank of memory on a subsequent clock cycle.

28. The traffic interference memory manager according to claim 17, wherein each of the plurality of receive antennas is operably connected to the external memory.

29. A computer program product, comprising:
a non-transitory computer-readable medium comprising:
code for causing a computer to cancel traffic interference, comprising instructions to:
store data in an external memory, wherein the data comprises received raw waveform data of incoming antenna samples of transmissions from a plurality of user equipments having different transmission time intervals, and the external memory comprises a plurality of slots for storing in-phase and quadrature sinusoidal component pairs of the received raw waveform data of incoming antenna samples of transmissions corresponding to each of a plurality of receive antennas starting on a multiple of 2 addressing boundary of the external memory; and
process the data on an internal memory comprising instructions to:
determine and cache portions of the data corresponding to each of the plurality of receive antennas to be processed on the internal memory by retrieving portions of the received raw waveform data from the external memory according to a plurality of sliding windows, wherein each sliding window corresponds to a respective one of the plurality of receive antennas, and the portions of the data to be processed comprise portions of the raw waveform data corresponding to at least one of the plurality of user equipments in a current transmission time interval;
refill the internal memory by reading new data from the external memory and updating the internal memory according to the plurality of sliding windows corresponding to the plurality of receive antennas,
store processed data to the external memory from the internal memory according to the plurality of sliding windows, wherein the processed data comprises a canceled waveform corresponding to at least one successfully decoded one of the transmissions, and
process another transmission using the canceled waveform for each of the plurality of user equipments having different transmission time intervals.

30. The computer program product according to claim 29, wherein the code for causing the computer to cancel traffic interference further comprises instructions to:
determine that multiple banks of memory are desired;
split the internal memory into the multiple banks of memory;
prevent consecutive memory accesses via a port to a same bank of memory; and
configure the port to access a different bank of memory on a subsequent clock cycle.

31. The computer program product according to claim 30, wherein the waveform data is striped such that ports access the waveform data in parallel.

32. The computer program product according to claim 29, wherein the instruction to refill the internal memory occurs every 256 chips.

33. The computer program product according to claim 29, wherein the instruction to store is performed periodically.

34. The computer program product according to claim 29, wherein the code for causing the computer to cancel traffic interference further comprises instructions to arbitrate accesses to the external memory including a low bandwidth memory.

35. The computer program product according to claim 29, wherein the code for causing the computer to cancel traffic interference further comprises instructions to arbitrate accesses to the internal memory including a high bandwidth on board cache.

* * * * *